United States Patent [19]

Sadri

[11] Patent Number: 4,863,537

[45] Date of Patent: Sep. 5, 1989

[54] TRACING PAPER WITH LIGHT TACK ADHESIVE COATING

[76] Inventor: Frederick F. Sadri, 2222 Beverly Dr., Charlotte, N.C. 28207

[21] Appl. No.: 132,711

[22] Filed: Dec. 11, 1987

Related U.S. Application Data

[63] Continuation of Ser. No. 17,476, Feb. 24, 1987, abandoned.

[51] Int. Cl.[4] .......... B32B 31/00; B32B 3/00; B32B 7/00

[52] U.S. Cl. .......... 156/62; 156/247; 156/289; 156/344; 427/208.4; 428/203; 428/343; 434/88

[58] Field of Search .......... 156/62, 247, 344, 289, 156/277, 249, 241, 242, 334; 428/203, 204, 205, 195, 198, 343, 352, 355, 918; 101/34, 33; 434/88; 427/208.4, 208.8, 208.6; 168/135

[56] References Cited

U.S. PATENT DOCUMENTS

| | | | |
|---|---|---|---|
| 3,922,464 | 11/1975 | Silver | 427/208.4 |
| 3,974,311 | 8/1976 | Cherrin | 428/343 X |
| 4,074,000 | 2/1978 | Hankee | 428/364 |
| 4,137,046 | 1/1979 | Koike et al. | 428/918 |
| 4,328,051 | 5/1982 | Robinette | 156/62 |
| 4,451,519 | 5/1984 | Irrgeher | 428/343 |
| 4,569,888 | 2/1986 | Muller et al. | 428/918 |
| 4,587,156 | 5/1986 | Wu | 428/343 X |
| 4,604,302 | 8/1986 | Isaksen | 427/208.6 |
| 4,659,409 | 4/1987 | Arafat | 156/249 |
| 4,702,942 | 10/1987 | Wood | 428/203 |

FOREIGN PATENT DOCUMENTS

| | | | |
|---|---|---|---|
| 2128937 | 5/1984 | United Kingdom | 434/88 |

*Primary Examiner*—Michael W. Ball
*Assistant Examiner*—Louis Falasco
*Attorney, Agent, or Firm*—W. Thad Adams, III

[57] ABSTRACT

A method of tracing graphic material present on an underlying substrate onto an overlying tracing paper. The method comprises providing a sheet of tracing paper and providing a thin coat of transparent, light tack adhesive applied in a single uniform layer array on both the lengthwise and widthwise dimension on one side of the sheet in a quantity sufficient for permitting the tracing paper to be temporarily but securely adhered to the underlying substrate without wrinkling, stretching or movement during the tracing process; applying the tracing paper with the adhesive thereon to the substrate; making the tracing together with any added material to the tracing paper; and removing the tracing paper from the substrate without damage to the tracing paper or to the underlying substrate while retaining all of the adhesive on one side thereof.

9 Claims, 2 Drawing Sheets

TRACING PAPER WITH LIGHT TACK ADHESIVE COATING

This application is a continuation, of application Ser. No. 017,476, filed 2/24/87, abandoned.

TECHNICAL FIELD AND BACKGROUND OF THE INVENTION

This invention relates to a tracing paper product particularly intended for use by artists, architects and draftsmen whose work involves starting from source material contained on a sheet of paper and modifying the material by tracing parts of the source material onto an overlying sheet of tracing paper. Designers and Architects in particular make numerous versions of a basic plan or layout to determine the suitability of one or more of the versions to an assignment. Trial and error sketches are repeatedly made by tracing a basic design, such as the perimeter of a building plan, from another sheet and then filling out the plan with variations which the architect believes may accomplish the design objectives.

During this particularly repetitive exercise, it is common practice to use a particularly expendable type of tracing paper known in the field as "bumwad," "trash paper," "canary yellow" among others. The paper is relatively cheap, thin and is usually supplied in rolls from which a desired quantity is dispensed by the user. The tracing paper is then placed on a drafting table over a sheet of paper on which appears the source material to be traced. The underlying paper may be a blueprint, a sheet of other tracing paper or even a series of sheets of tracing paper. Tracing paper of this type is cheap, not intended for archival ues, is very translucent and thus a number of sheets can be superimposed on top of each other during the trial and error design process as desired.

The most common prior conventional attachment method involves simply taping the four corners of the tracing paper to the underlying sheet with drafting tape. This method requires several pieces of tape to be arbitrarily torn off from a roll to be applied at the four corners of the tracing paper. A reasonable amount of care must be taken in this process of smoothing the paper down before taping, in order to avoid wrinkles in the paper which tend to destroy the registration between the underlying graphic design and the traced design. Even if the tracing paper starts out relatively smooth, pencil lines and pressure applied by the hand of the artist can cause the paper to wrinkle or "travel."

Another, somewhat of an improvement, has been the invention of small paper dots having adhesive on one side which are more conveniently dispensed from a roll one-by-one and are used instead of having to tear off drafting tape to secure the corners of the tracing paper to the underlying sheet. While the dots are easier to dispense from the tape, they also do not necessarily keep the tracing paper from wrinkling or stretching.

It is possible, if one thinks or knows to do so, to manually spray the back of the tracing paper with an artist's adhesive after tearing of the tracing paper from the roll and before applying to the underlying sheet. However, this cannot be done manually consistently in a uniform manner. While the tracing paper can be made to cling to the underlying sheet, areas of light application will separate from the underlying sheet and cause a "bubble." Areas of heavy application can cause the tracing paper to adhere so firmly that it may well tear upon removal and can also leave a residue of adhesive which makes the underlying sheet unusable.

SUMMARY OF THE INVENTION

Therefore, it is an object of the invention to provide a tracing paper product for tracing graphic information from source material present on an underlying substrate.

It is another object to provide a tracing paper product for being quickly but temporarily securely adhered to an underlying substrate, such as a sheet of paper, without wrinkling, stretching or movement during use.

It is a further object of the invention to provide a tracing paper product in roll form having a light tack adhesive on one side of the tracing paper.

These and other advantages of the present invention are achieved by providing a tracing paper product for tracing graphic information from source material present on an underlying substrate. The improvement according to the invention comprises a thin coat of a transparent, light tack adhesive applied in a uniform array on both the lengthwise and widthwise dimension on the outer face side of a roll of the tracing paper product in a quantity sufficient for permitting the tracing paper product to be temporarily but securely adhered to the underlying substrate without wrinkling, stretching and movement during the tracing process. Then, the tracing paper can be removed without damage to the previous tracing paper or to the underlying substrate while retaining all of the adhesive on the one side of the tracing paper. The tracing paper product is usable as described above a plurality of times before the adhesive loses its effectiveness.

Preferably, the tracing paper product comprises a roll of paper for permitting a sheet of a predetermined length to be dispensed as desired.

In accordance with another embodiment of the invention, the tracing paper product comprises single sheets.

According to one embodiment of the invention, the array on the one side of the tracing paper comprises a multitude of closely spaced-apart spots of adhesive.

According to another embodiment of the invention, the array on the one side of the tracing paper comprises an even, uniform, continuous coat of adhesive.

In yet another embodiment of the invention, the array on the one side of the tracing paper comprises a multitude of closely spaced-apart diagonal lines of adhesive collectively forming a grid-like pattern.

The adhesive may suitably comprise trichloreothane and diethylene ether.

The coating of adhesive is preferably applied at a rate of from one-twentieth to one fifth the rate of the same type of adhesive when applied to achieve permanent, short term adhesion.

BRIEF DESCRIPTION OF THE DRAWINGS

Some of the objects of the invention have been set forth above. Other objects and advantages of the invention will appear as the description of the invention proceeds when taken in conjunction with the following drawings, in which.

DESCRIPTION OF THE PREFERRED EMBODIMENTS

Figure 1:
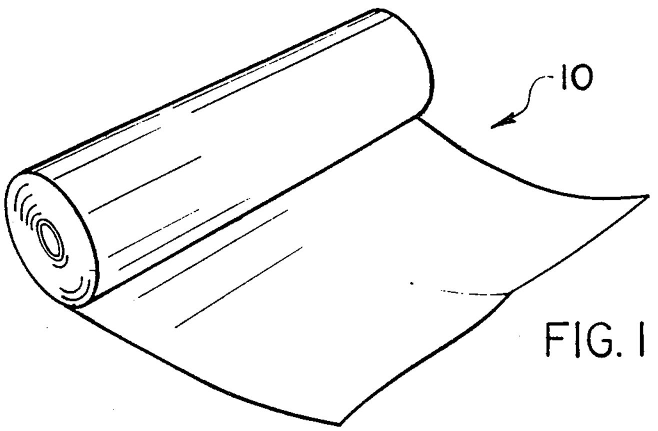
FIG. 1 is a roll of the tracing paper product according to the present invention.

Referring now specifically to the drawings, a tracing paper product according to the present invention is illustrated in FIG. 1 and shown generally at reference numeral 10. Paper product 10 comprises a cheap, throw-away type of tissue tracing paper known to the trades as "bumwad," "trash paper," "canary yellow" among others. The product in its prior form without adhesive is well known and almost universally used by architects, draftsmen and designers. While, as is shown in FIG. 1, the product is most often sold in rolls 12"(30.5 cm), 18"(45.7 cm) and up to 42" (106.68 cm) wide, it can also be purchased in packages of single sheets and the invention here also contemplates this use.

Figure 3:
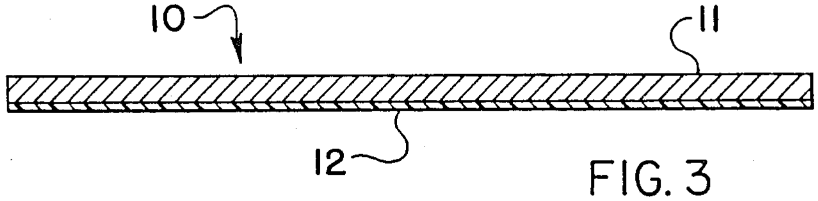
FIG. 3 is a vertical cross-sectioal view of the tracing paper product according to one embodiment of the invention.

The product is shown schematically in cross-section in FIG. 3. Product 10 comprises a paper sheet 11 onto which is applied a very thin coat of adhesive 12. The principal of application is that the rate of application should be from between one-twentieth to one-fifth the rate of application of the same type of adhesive when applied as known in the prior art to effect a permanent but short-term bond between two surfaces, with the ideal rate being about one-tenth the rate. The general type of adhesive 12 used is a trichloroethane diethylene ether, such as is manufactured by 3M Company and sold in aerosol form under the trademark "SPRAY MOUNT" (Catalog No. 6065).

Figure 2:
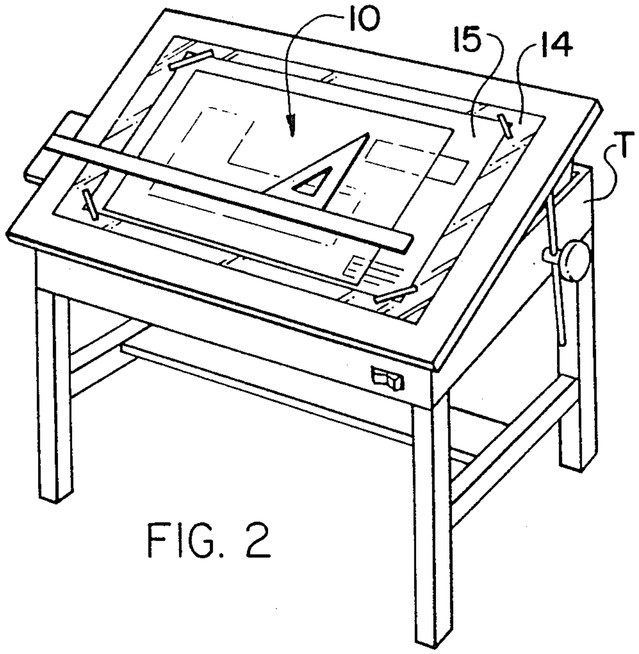
FIG. 2 is a environmental view of the tracing paper product in use on an underlying substrate on a light table with the conventional taped corners.

A typical manner of use of product 10 is shown in FIG. 2. A light table "T" is provided with a glass work surface 14 through which a bright light (not shown) under the table shines. A drawing 15 which serves a source of graphic information on which the tracing is done is taped to work surface 14. According to prior art methods, the tracing paper would then be adhered to the drawing 15 with tape or adhesive tabs. In accordance with the invention, a suitable length of the paper product 10 is unrolled, placed over drawing and quickly swept down and held with one hand. With the other hand, the roll is simply jerked, causing the paper 10 to tear, leaving the appropriate length in place over the drawing 15. The roll is laid down and without moving the other hand the paper is smoothed onto the drawing 15. Within seconds, product 10 is now in place and ready to use. Since it is adhered at all points on its under surface to drawing 15, pressure at any given point is insufficient to cause wrinkling or shifting. If necessary, additional sheets can be placed one on top of the other in the same manner and with the same effect. Because of the very thin coating of adhesive 12, sheets of the product 10 can be removed as desired without damage to the drawing 15 or to the product 10.

As is shown in FIG. 3, even though the paper 11 is itself very thin, the adhesive 12 is much thinner and is applied at such a low rate of application that its presence is barely perceptible. It is important to emphasize that the paper product 11 is intended for use only for very short periods of time. Long term holding capability is unnecessary. All that is required is that the adhesive shall hold just well enough to resist "travel" from pencil and hand pressure applied by the user. Frequently repeated modifications of the drawing being prepared will necessitate that numerous layers of the paper product 10 be placed over each other. The very thin coat of adhesive quickly facilitates this layering while permitting the layers to be removed as desired without tearing or disrupting underlying layers.

It is important that the adhesive 12 be of such consistency as to not cling to the drawing 15 when product 10 is removed. At the rates specified above, the adhesive is sufficiently dispersed on the surface of the paper 11 that a very high percentage of the individual atomized droplets of adhesive 12 are applied to the surface of the paper 11 and not to underlying droplets of adhesive 12.

Since the product is preferably supplied in roll form, calendaring or other treatment of the obverse surface of paper 11 may be desirable to further minimize the occurrence of adhesive 12 remaining on the obverse surface when the paper is unrolled for use.

Figure 4:
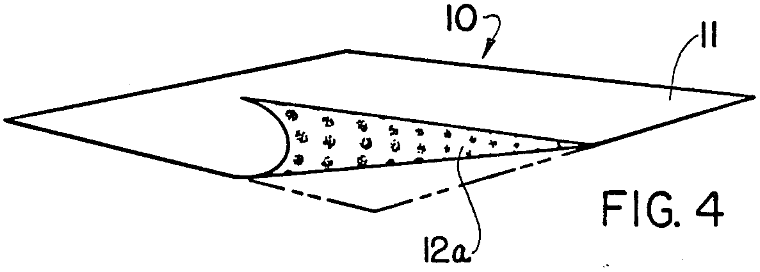
FIG. 4 is a perspective view of the adhesive pattern according to one embodiment of the invention.
Figure 5:
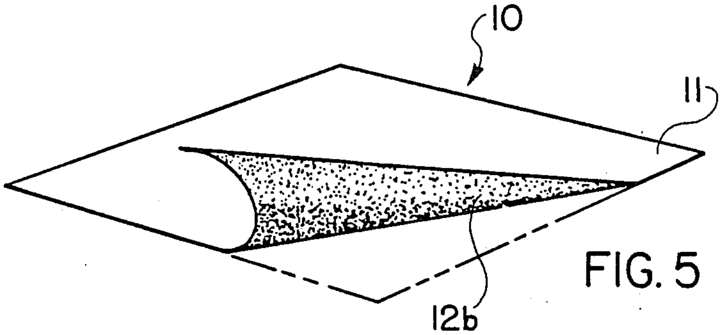
FIG. 5 is a perspective view of the adhesive pattern according to antoher embodiment of the invention.
Figure 6:
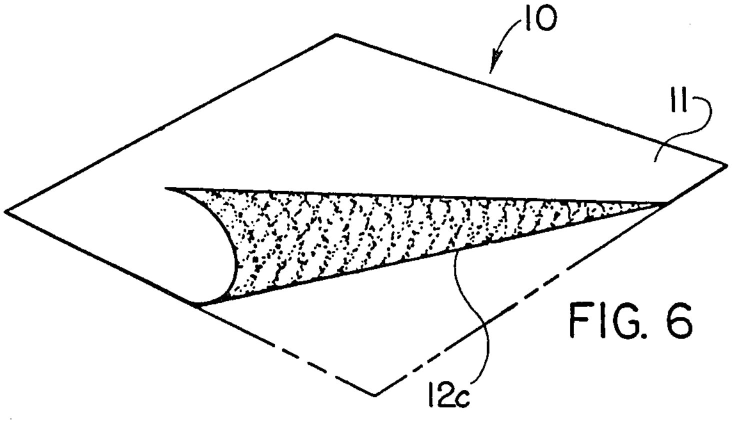
FIG. 6 is a perspective view of the adhesive pattern according to yet another embodiment of the invention.

The adhesive 12 should be applied in a uniform array to to the surface of paper 11. The term "uniform array" includes the application of a uniform or regular repeating pattern of closely spaced-apart dots of adhesive 12*a* (FIG. 4); a smooth, even coat of adhesive 12*b* which actually comprises a multitude of infinitesimally small, closely spaced apart microdroplets of adhesive which appears to be a smooth coat (FIG. 5), or a regular repeating pattern of a diamond-shaped grid of adhesive 12*c* (FIG. 6).

The product 10 will retain enough of its adhesive 12 during removal and handling so that it can be removed from drawing 15 several times and re-adhered before loosing its adherent qualities. This is due primarily to accumulation of surface oils, dirt and the like on the adhesive 12, and not to the release of the adhesive from the sheet 11.

A tracing paper product is described above. Various details of the invention may be changed without departing from its scope. Furthermore, the foregoing description of the preferred embodiment according to the present invention is provided for the purpose of illustration only and not for the purpose of limitation—the invention being defined by the claims.

I claim:

1. A method of tracing graphic material present on an underlying substrate onto an overlying tracing paper, comprising the steps of:

(a) providing a sheet of transparent tracing paper;

(b) coating a transparent light tack adhesive in a single uniform layer in a non-continuous array onto both a lengthwise and widthwise dimension on one side of said sheet in a quantity sufficient for permitting the tracing paper to be temporarily but securely adhered throughout its entire coated surface area to the underlying substrate without wrinkling, stretching or movement during the tracing process;

(c) applying the tracing paper with the adhesive thereon to the substrate;

(d) making a tracing by copying material on the underlying substrate as seen through the tracing paper together with an added material onto the tracing paper; and (e) removing the tracing paper from the substrate without damage to the tracing paper or to the underlying substrate while retaining all of the adhesive on the tracing paper.

2. A method of tracing graphic material according to claim 1, and including the step of applying successive sheets of tracing paper over the substrate and previously adhered sheets of tracing paper for making tracings of a composite source material collectively present on the underlying sheets of tracing paper and the substrate.

3. A method of tracing graphic material according to claim 1, and including the step of using a single sheet of tracing paper a plurality of times before the adhesive loses its effectiveness.

4. A method of tracing graphic material according to claim 1, wherein the step of providing a supply of tracing paper comprises providing the tracing paper in roll form.

5. A method of tracing graphic material according to claim 1, wherein the step of providing a supply of tracing paper comprises providing single sheets of the tracing paper.

6. A method of tracing graphic material according to claim 1, wherein the array on one side of the tracing paper comprises a multitude of closely spaced-apart spots of adhesive.

7. A method of tracing graphic material according to claim 1, wherein the array on the one side of the tracing paper comprises a multitude of closely spaced-apart diagonal lines of adhesive collectively forming a grid-like pattern.

8. A method of tracing graphic material according to claim 1, wherein the step of applying to the tracing paper an adhesive comprises the step of applying a combination of trichloroethane and diethylene ether.

9. A method of tracing graphic material according to claim 1, wherein the step of providing a thin coat of adhesive comprises coating the tracing paper with the adhesive at a rate from 1/20 to 1/5 the rate of application of the same type of adhesive when applied for permanent, short term adhesion.

* * * * *